United States Patent [19]

Zak

[11] Patent Number: 5,631,814

[45] Date of Patent: May 20, 1997

[54] UNINTERRUPTIBLE POWER SUPPLY BASED ON NON-INVASIVE CONNECTION OF BACKUP CIRCUIT TO SWITCH POWER SUPPLY

[75] Inventor: Alexander Zak, Ashkelon, Israel

[73] Assignees: Abraham Lavsky; Hanan Gazit, both of Tel Aviv, Israel; part interest to each

[21] Appl. No.: 490,693

[22] Filed: Jun. 16, 1995

[51] Int. Cl.[6] .......................... H02M 5/45; H02M 5/458; H02J 7/00; H02J 9/00

[52] U.S. Cl. .................................. 363/37; 307/66

[58] Field of Search ...................... 363/34, 37; 307/64, 307/66

[56] References Cited

U.S. PATENT DOCUMENTS

| | | | |
|---|---|---|---|
| 4,728,808 | 3/1988 | Bet-Esh et al. | 307/66 |
| 5,229,650 | 7/1993 | Kita et al. | 363/37 |
| 5,241,217 | 8/1993 | Severinsky | 307/64 |
| 5,247,205 | 9/1993 | Mototani et al. | 307/66 |
| 5,289,045 | 2/1994 | Lavin et al. | 307/64 |
| 5,369,561 | 11/1994 | McCullough | 363/37 |
| 5,369,563 | 11/1994 | Miller | 363/56 |
| 5,371,666 | 12/1994 | Miller | 363/98 |
| 5,461,263 | 10/1995 | Helfrich | 307/64 |
| 5,465,011 | 11/1995 | Miller | 307/64 |

OTHER PUBLICATIONS

Dual-Output Power-Supply Controller for Notebook Computers, Max 786, Maxim Intergrated Products, 1993.

*Primary Examiner*—Peter S. Wong
*Assistant Examiner*—Bao Q. Vu
*Attorney, Agent, or Firm*—Browdy and Neimark

[57] ABSTRACT

An uninterruptible power supply provides internal or external connection of an auxiliary power source to a main power supply so as to provide continuous device power without requiring any modification to the main power supply itself and without duplicating its power circuit. The uninterruptible power supply (UPS) comprises a switch power supply (SPS) including a rectifier, DC to DC converter and at least one holdover capacitor connected across the input terminals of DC to DC power converter. A backup system supplies DC power from a battery to the holdover capacitors, and a back up control circuit supplies high voltage DC energy to the SPS at fixed time intervals and ensures smooth transition to AC utility power upon resumption of such power following a failure. An auxiliary AC power output signal is maintained for a video monitor or other device during operation of the uninterruptible power supply.

5 Claims, 5 Drawing Sheets

UNINTERRUPTIBLE POWER SUPPLY BASED ON NON-INVASIVE CONNECTION OF BACKUP CIRCUIT TO SWITCH POWER SUPPLY

FIELD OF THE INVENTION

This invention relates to uninterruptible power supplies.

BACKGROUND OF THE INVENTION

Presently available uninterrupted power supplies are based on a modular architecture whereby the uninterruptible power supply (UPS) is connected between an AC utility power line and a switch power supply (SPS). The SPS is continually fed AC power which it converts to appropriate regulated and unregulated DC output voltages, as required. Conventional design of such systems is based on a four-fold conversion of electrical energy, as follows:

(1) the incoming AC power is converted to DC at approximately the level of the backup battery voltage, with a small residual charge being available in order to ensure that the battery remains charged at all times;

(2) DC to AC conversion of the DC voltage so as to provide an AC voltage level which approximates to that of the incoming AC line;

(3) conversion of the AC voltage level to a high voltage DC level for energizing the high frequency converter in the SPS; and (4) multi-channel conversion of DC voltage to DC voltage so as to provide the required DC voltage outputs.

The switch power supply receives power all the time either from the AC utility power line or, in the event of a power failure, from a backup battery. Such systems must work at relatively high power levels of typically 200–300 watts and are typically only 75–80% efficient. Moreover, the multi-stage mode of power conversion in most existing UPS systems require large and expensive components and, more particularly, duplication of regulation and switching circuits. Such duplication adds significantly to the resulting costs of the UPS.

In order to avoid such duplication, U.S. Pat. No. 5,289,045 (Lavin et al.) discloses an uninterruptible power supply which provides internal connection to an auxiliary power supply so as to provide continuous device power without duplicating regulation and switching circuits. The power supply includes an AC to DC converter, a transformer and a switch applying DC power from the converter to the transformer. A pulse width modulation control circuit assures a regulated output voltage which application of auxiliary power is controlled by a fixed time interval one-shot that assures a smooth transition to AC utility power upon resumption of such power following a failure. An auxiliary AC power output signal is maintained for a video monitor or other device even while operating on auxiliary power.

Whilst duplication of the regulation and switching circuits is indeed avoided in the UPS proposed by Lavin et at., this is at the expense of necessitating that either the main power supply and the auxiliary power supply are designed as an integral unit or, alternatively, that the main power supply be modified in order to allow effective connection thereto of the auxiliary power supply. Specifically, the main power supply proposed by Lavin et al. employs a transformer having a single primary winding and two sets of center-tapped secondary windings, each arranged as a push-pull winding pair. The primary winding is connected to a high voltage switched DC voltage whilst the first set of secondary windings is selectively wound to produce a 5 volt output, the second set of secondary windings being wound to produce plus and minus 12 volt outputs. In the event of a main power failure, the appropriate 12 volt levels are fed to the secondary windings of the transformer via a backup or auxiliary power supply energized by a pair of 12 volt batteries via a power switch. The power switch operates in response to pulse width control signals from the pulse width modulator circuit to drive alternately opposite sides of the 12 volt secondary transformer winding with the nominal 24 volt auxiliary power from the batteries.

Duplication of circuitry is avoided by using the same pulse width modulator circuit to regulate the secondary winding voltages during both battery operation and during normal AC utility power operation. However, it will be understood that this is made possible only by designing both the main power supply and the auxiliary power supply as an integral unit and this, in turn, means that the auxiliary power supply proposed by Lavin et al. is unsuitable for direct connection to conventional off-the-shelf power supplies such as are commonly used in computers and the like. It should also be noted that the solution proposed by Lavin et al. requires access to the transformer secondary windings in order to connect the auxiliary power supply thereto. This again implies redesign of the secondary transformer, thereby greatly increasing the manufacturing cost of the main power supply.

Yet a further consideration relates to the fact that the transformer 24 V secondary winding is designed for producing 12 V DC at a power rating of approximately 100 W, whilst the 12 V secondary winding is employed for producing 5 V DC at a power rating typically in the order of 200 W. When a power failure occurs in the AC power line, auxiliary power is supplied via the transformer 12 V secondary winding. The auxiliary power must be sufficient not only to produce the standard ±12 V DC and ±5 V DC levels which are produced by the main power supply, but must also provide sufficient power for allowing connection of a peripheral device, such as a video monitor, to the AC output of the power switch. Even if only the original 300 W is supplied via the transformer 12 V secondary winding, this still exceeds its power rating by a factor of 3. Bearing in mind that additional power may also be required for driving auxiliary circuitry, the total power which must be provided by the UPS may well exceed the maximum power rating of the 12 V transformer secondary winding by a factor of more than 3. Thus, the transformer 12 V secondary winding must be rewound with larger gauge wire and this requires dismantling the transformer laminations. It may then be impossible to accommodate thicker windings on the existing transformer core, requiring replacement of the whole transformer with a larger transformer having a higher power rating. A larger transformer occupies more space and usually cannot be accommodated on the original printed circuit board, requiring replacement of the complete PCB.

Furthermore, since a quasi alternating voltage is applied by the power switch to the transformer secondary winding when the main AC power fails, it is necessary to ensure that the signal supplied by the power switch is in phase with the original AC at the moment of changeover: both when the main AC power fails and also when it is restored. This requires that the power switch be synchronized by PWM control signals which are common to both the SPS and the auxiliary power supply. It is not feasible merely to hard-wire the output of the PWM in the SPS to the auxiliary power supply because of the susceptibility of stray mains frequency 60/50 Hz pickup by the wires and thus the whole of the PCB must be redesigned, thereby greatly increasing the cost of the SPS.

The manufacturing cost of a conventional power supply for use with a personal computer, for example, is of the order of US$ 8.00. To build the power supply proposed by Lavin et al. which enables connection thereto of a UPS, bearing in mind the above considerations, would increase the manufacturing cost of the main power supply by a factor of approximately 10 owing to the required redesign of the main power supply.

Even apart from cost considerations, safety factors militate against employing the auxiliary power supply proposed by Lavin et al. with a conventional power supply unless the two are co-designed as an integral UPS. Thus, the standard short circuit protection circuitry in the switch power supply cannot function to interrupt current to the load if the power switch connected to the battery backup fails, because the current supplied by the battery does not flow through the switch power supply. Consequently, a short circuit across the output of the auxiliary power supply may have irreparable and possibly dangerous consequences unless, of course, separate short circuit protection is provided within the auxiliary power supply, again adding to the overall cost.

U.S. Pat. No. 4,728,808 (Bet-Esh et al.) also discloses an uninterruptible power supply system having input terminals connectable to an AC power source and leading to an AC to DC converter for producing a first DC voltage source and a second DC voltage source operationally connected to the first source. The system supplies at the output of the second source a voltage normally primarily provided by the first DC source. A capacitive accumulator device is connected in parallel with a voltage sensing and controlling circuit and with the output of the two DC sources. The sensing and controlling circuit controls the output of at least the second of the DC voltage sources so as to provide at the output terminals of the system a substantially constant output voltage even when the AC power source to which the system is connected is interrupted.

The system disclosed by Bet-Esh et al. also requires that the UPS be designed as a composite device and does not allow connection of the second DC voltage source, constituting the backup or auxiliary DC voltage, to a conventional off-the-shelf main power supply without significant modification thereof.

SUMMARY OF THE INVENTION

It is an object of the invention to provide an uninterruptible power supply which allows for connection of an auxiliary, backup DC power source to a conventional off-the-shelf main power supply without requiring modification to the latter. By such means, the low manufacturing cost of conventional power supplies such as are used in computers, for example, may be maintained whilst providing all of the advantages of a UPS.

According to the invention there is provided an uninterruptible power supply including a main power supply and a backup power supply for supplying at least DC electrical power to a load;

the main power supply comprising:
  an AC power source for producing an AC line voltage, and
  a switch power supply connected to the AC power source and including at least one holdover capacitor for storing charge and having a DC output for providing DC electrical power to the load; and the backup power supply comprising:
  a DC energy storage device,
  a detector circuit coupled to the AC power source for detecting a loss of said AC line voltage,
  a backup circuit coupled to the energy storage device, to the at least one holdover capacitor and to the DC output of the switch power supply and being coupled to the detector and responsive to a loss of said AC line voltage for supplying DC power from the DC energy storage device to the at least one holdover capacitor of the Switch Power Supply and being responsive to an existence of said AC line voltage for providing charging current to the DC energy storage device.

Thus, in essence, the invention allows for the connection of a high voltage DC backup voltage derived from the backup power supply directly to the holdover capacitor of the main power supply so as to substitute for the loss of high voltage DC from the AC to DC converter, in the event of a main power failure. This having been done, all of the SPS control and stabilization circuitry which, in any event, is provided as standard in the main power supply, may continue to be used since, so far as the main power supply is concerned, there is no difference whether the high voltage DC level across the holdover capacitor is provided via AC to DC conversion of the main AC power line, or via DC to DC conversion of the backup battery. Thus, duplication of the control and regulation circuits is avoided whilst allowing the conventional main power supply to be used without any modification whatsoever.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
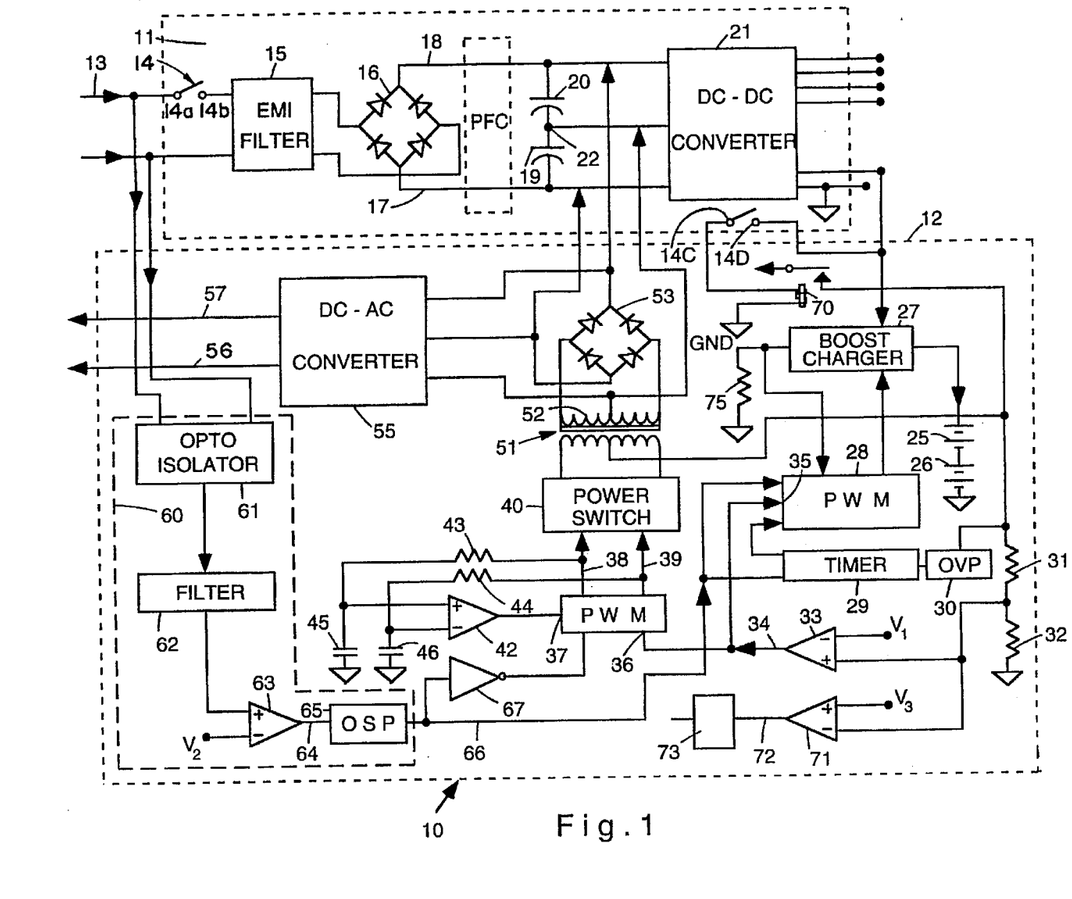
FIG. 1 is a schematic representation of an uninterruptible power supply employing a conventional switch power supply according to the invention.

FIG. 1 is a circuit diagram showing schematically an uninterruptible power supply (UPS) designated generally as 10 and comprising a conventional off-the-shelf switch power supply (SPS) 11 operating in conjunction with a backup power supply 12. The main power supply 11 is connected across a main AC utility power line 13 via a 2-pole 2-way ON-OFF switch 14 having a first switch contact 14A connected to the AC power line 13 and a second switch contact 14B connected to an EMI filter 15 for reducing electromagnetic interference from the main AC power line. A full wave high voltage bridge rectifier 16 is connected to an output of the EMI filter 15 for producing a 300 V DC voltage across a pair of low and high voltage rails 17 and 18, respectively. Connected across the low and high DC voltage rails 17 and 18 is a pair of series-connected holdover or bulk capacitors 19 and 20 which remain in a charged state for so long as a DC voltage level exists across the low and high DC voltage rails 19 and 20.

A DC to DC converter 21 is connected between the low and high DC voltage rails 17 and 18 and also to a common junction 22 of the holdover capacitors 19 and 20. The DC to DC converter 21 converts the high voltage DC level at its input to a plurality of regulated DC output levels according to the specific requirements of the manufacturer of the SPS. Thus, when the SPS is employed as the main power supply in a personal computer, the DC output levels include at least a 12 volt DC level and a 5 volt DC level for powering the computer's electronics.

The SPS 11 may also be provided with power factor correction circuitry and, if so, this is connected between the bridge rectifier 16 and the DC to DC converter 21. However, since this has no bearing on the connection of the backup power supply which will now be described, and is therefore not a feature of the present invention, it is not described in further detail.

The backup power supply 12 comprises a pair of series-connected 12 volt batteries 25 and 26 which are maintained in a fully charged state, for so long as AC power is supplied to the main AC power line, by means of a boost charger 27 connected to the 12 volt output of the DC to DC converter 21 in the SPS 11. The boost charger 27 receives pulse width modulated control signals from a current mode PWM 28 which receives timing signals from a timer circuit 29 connected to the high voltage terminal of the battery 25 via an over-voltage protection circuit 30. The voltage across the batteries 25 and 26 is also fed via a voltage divider comprising resistors 31 and 32 to the non-inverting terminal of a comparator 33 whose inverting terminal is connected to a voltage reference $V_1$. An output 34 of the comparator 33 is fed to a shut-down input terminal 35 of the PWM 28 as well as to a shut-down input terminal 36 of a second PWM 37. Output connections 38 and 39 of the second PWM 37 are connected to a power switch 40 and also to respective non-inverting and inverting inputs of an OP AMP 42 via resistors 43 and 44, respectively. The non-inverting and inverting inputs of the oP AMP 42 are connected to GND via respective capacitors 45 and 46.

A center-tapped primary winding 50 of an isolating transformer 51 is connected to an output of the power switch 40 with its center tap connected to the 24 volt terminal of the batteries 25 and 26. A center-tapped secondary winding 52 of the isolating transformer 51 is connected to the AC input terminals of a bridge rectifier 53 whose DC output terminals are connected to the low and high DC voltage rails 17 and 18 as well as to a DC to AC converter 55 having a pair of outputs 56 and 57 across which there appears an AC voltage similar to that of the main AC power line and which may be used to provide continuous power to a peripheral device such as a video monitor or printer. The combination of the auxiliary power supply and the SPS thus functions as an on-line UPS preventing flashing of the CRT screen of the video monitor when switching between main and auxiliary power supplies. The center tap of the secondary winding 52 is connected to the common junction 22 of the two holdover capacitors 19 and 20 as well as to the DC to DC converter 55.

In order to detect the presence or absence of voltage across the main AC power line, there is provided a detector circuit 60 comprising an opto isolator 61 coupled, via a filter 62, to the non-inverting input of a comparator 63 whose inverting input is connected to a voltage reference $V_2$. An output 64 of the comparator 63 is connected to an over-switch protection circuit (OSP) 65 having an output 66 which is fed to the timer 29 and to the PWM 28 and, via an inverter 67, to the second PWM 37.

The internal circuitry of the backup power supply 12 is derived from the 24 volt terminal of the batteries 25 and 26 via a relay 70 having a coil connected between GND and the 12 volt output of the DC to DC converter 21 via the normally open switch contacts 14C and 14D of the 2-pole 2-way ON-OFF switch 14. It should be noted, in this connection, that conventional switch power supplies are provided as standard with 2-pole 2-way ON-OFF switches, one pole being used for each of the live and neutral lines. It is therefore a simple matter to adapt off-the-shelf switch power supplies for use with the backup power supply of the invention, merely by disconnecting the ON-OFF switch from the neutral connection and utilizing the additional switch contacts thus available for the backup power supply, as proposed.

In order to provide an audible indication of the discharge of the backup batteries 25 and 26, the output of the voltage divider 31 and 32 is also connected to the inverting terminal of a comparator 71 whose non-inverting terminal is connected to a voltage reference $V_3$. An output 72 of the comparator 71 is connected to a buzzer 73. When the batteries 25 and 26 start to discharge, their voltage falls and, consequently, the voltage at the output of the voltage divider constituted by the series resistors 31 and 32, also falls. When the voltage at the output of the voltage divider falls below the reference voltage $V_3$, a drive signal appears at the output 72 of the comparator 71 for activating the buzzer 73.

The operation of the backup power supply 12 will now be described. Under normal operating conditions, the ON-OFF switch 14 is "ON" and the switch power supply 11 receives energy directly from the main AC power line via the EMI filter 15 and the high voltage bridge rectifier 16. The high voltage bridge rectifier 16 provides at its output a 300 volt DC level which is applied across the low and high DC voltage rails 17 and 18 so as to charge the holdover capacitors 19 and 20 and feed the DC to DC converter 21. Likewise, the 300 volt rails 17 and 18 are connected to the DC to AC converter 55 for providing a 110/220 volt 60/50 Hz step wave voltage for driving a peripheral device such as a video display or printer connected across the DC to AC converter 55.

The 12 volt output from the DC to DC converter 21 is fed to the boost charger 27 for charging the backup batteries 25 and 26 and maintaining them, at all times, in a fully charged state for so long as power is supplied to the main AC power line. The pulse width modulator 28 provides pulses to the boost charger 27 having a duty cycle so determined as to provide the necessary charge current. The charge current magnitude is set by means of a resistor 75 which functions as a boost current sensor for feeding the measured boost current to the PWM 28. The charge time is determined by the timer 29 and the battery voltage level is determined by the over-voltage protection circuit (OVP) 30.

The opto isolator switch 61, the filter 62, the comparator 63 and the over-switching protection circuit (OSP) 65 provide constant monitoring of the AC power source so that, when AC power exists across the main AC line, the PWM 37 and the power switch 40 are disabled, whilst the PWM 28 is enabled for providing charge to the batteries 25 and 26.

Thus, under normal operating conditions, the backup power supply 12 does not supply energy to the DC to DC converter 21 in the switch power supply 11.

Under normal operating conditions, the output voltage of the filter which is fed to the non-inverting input of the comparator 63 exceeds the reference voltage $V_2$ applied to the inverting input, and the output of the comparator 63 is therefore high. However, in the event of a main AC supply power failure, the output voltage of the filter 62 drops below the reference voltage $V_2$, causing the comparator 63 to go low thus disabling the PWM 28. At the same time, the output of the inverter 67 goes high, providing an actuation signal via the over-switching protection circuit 65 so as to enable the PWM 37. In an actual embodiment of the invention, reduced to practice, both of the PWMs 28 and 37 were realized by a single integrated circuit sold under the catalogue number MAX 786 by Maxim.

When the PWM 37 is enabled, the 24 volt output of the backup batteries 25 and 26 is converted by the power switch 40, the isolating transformer 51 and the bridge rectifier 53 to a pair of high voltage DC levels having magnitudes of +150 V and -150 V with respect to the center tap of the transformer secondary winding 52. These DC voltage levels are fed to the respective holdover capacitors 19 and 20 so that the overall voltage across the low and high DC voltage rails 17 and 18 is 300 V, corresponding to the high voltage DC level supplied by the bridge rectifier 16 in the switch power supply 11.

For so long as there is power loss on the main AC power line 13, power is supplied to the DC to DC converter 21 in the switch power supply 11 by the power switch 40 until the batteries 25 and 26 become discharged, whereupon the voltage fed by the voltage divider 31, 32 to the non-inverting input of the comparator 33 falls below the voltage reference $V_1$ fed to its inverting terminal. When this happens, the output of the comparator 33 goes low thus feeding a zero volt shut-down signal to both of the PWMs 28 and 37 so as to shut down all of the control circuits in the backup power supply 12. At the same time, the voltage fed to the inverting input of the comparator 71 falls below the voltage reference $V_3$ applied to its non-inverting input, causing the comparator 71 to activate the buzzer 73 so as to provide an audible warning of the complete absence of power.

Likewise, when the ON-OFF switch 14 is opened, the switch contacts 14c and 14d are disconnected, thereby interrupting power to the relay coil 70. This also causes power to the auxiliary circuitry in the backup power supply 12 to be interrupted but, in this case, no audible warning is required so long as the batteries 25 and 26 are fully charged. The ON-OFF switch 14 thus functions correctly whether power is supplied by the mains AC supply or by the auxiliary power supply for switching the power supply OFF when required. Without the switch contacts 14C and 14D in the auxiliary power supply, there would be no way to switch off the power supply in the event of an AC mains power failure because the relay coil 70 would remain energized for so long as the 12 volt output of the DC to DC converter 21 is maintained. Moreover, a short circuit fault causes the short circuit protection circuitry in the DC to DC converter 21 to deactivate the 12 volt output of the DC to DC converter 21, thereby deenergizing the relay coil 70 and shutting down the auxiliary power supply.

Upon restoration of the main AC supply after a power failure with the ON-OFF switch 14 closed, the output from the opto isolator switch 61 is restored and, consequently, the PWM 37 is again disabled so as to deactuate the power switch 40, whilst the PWM 28 is enabled for operating the boost charger 27 which charges the batteries 25 and 26.

Figure 2:
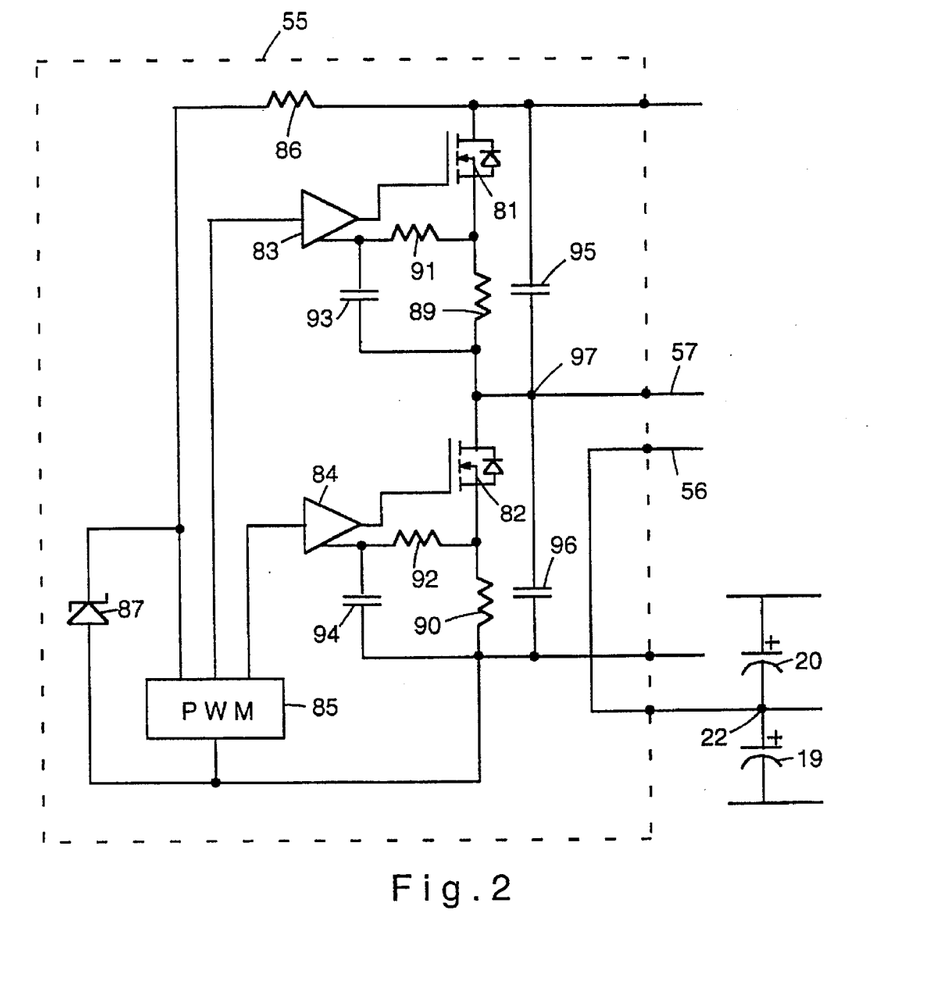
FIG. 2 is a simplified schematic representation of a DC to AC converter for use with the UPS shown in FIG. 1.

Reference is now made to FIG. 2 of the drawings showing in detail the DC to AC converter 55 shown functionally in FIG. 1. A pair of power MOSFETS 81 and 82 are driven by respective drivers 83 and 84 connected to a pulse width modulation circuit 85. Power is derived from the +150 V and -150 V voltage levels produced by either of the bridge rectifiers 16 or 53, the +150 V level being fed, via a resistor 86, to the PWM 85 and, via a Zener diode 87, to the -150 V level. The driver circuits 83 and 84 control the respective MOSFETs 81 and 82, the current being supplied to the respective gates of the MOSFETs 81 and 82 being monitored by means of corresponding sensing resistors 89 and 90. The voltages across the sensing resistors 89 and 90 are filtered by RC filters comprising respective resistors 91 and 92 and respective capacitors 93 and 94. A pair of snubber capacitors 95 and 96 are connected between the +150 V and the -150 V rails, and have a common junction 97 which constitutes an output terminal of the DC-AC converter 55.

The pulse width modulator 85 provides a nominal 65% duty cycle at 60/50 Hz so as to cause the MOSFETs 81 and 82 to supply a ±150 volt peak-to-peak quasi square wave power signal at 60/50 Hz to the common junction 97 of the snubber capacitors 95 and 96, constituting the output terminal 57 shown in FIG. 1. The low voltage rail 56 of the DC to AC converter 55 is connected directly to the input terminal of the DC to AC converter terminal 55 which is connected to the center tap of the secondary winding 52 of the isolating transformer 51 which itself is connected to the common junction 22 of the holdover capacitors 19 and 20.

Figure 3:
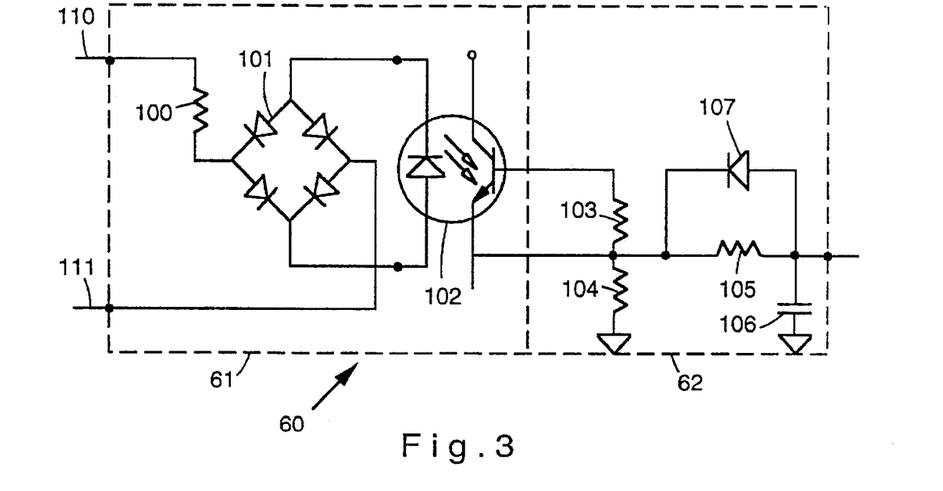
FIG. 3 is a schematic representation of an opto-isolation switch and filter circuit for use with the UPS shown in FIG. 1.

FIG. 3 shows a detail of the AC power detection circuit 60 comprising the opto isolator switch 61 and filter 62. The opto isolator switch 61 comprises a current limiting resistor 100 coupled to a full wave bridge rectifier 101 which supplies DC voltage to an opto-coupler 102 which is itself coupled to the filter 62.

The filter 62 comprises a ballast resistor 103 connected to ground GND via a resistor 105 and connected, via another resistor 105 of equal value to the resistor 104, to a capacitor 106 whose other terminal is connected to GND. A rectifier diode 107 is connected across the resistor 105 with its anode being connected to the common junction of the resistor 105 and the capacitor 106.

Input terminals 110 and 111 of the opto isolator switch 61 are connected across the AC main power line so as to receive therefrom a sinusoidal voltage which is fed to the opto coupler 102. The sinusoidal voltage waveform is converted by the opto coupler 102 to a square wave signal having a duty cycle which is determined by the magnitude of the resistor 103 and the voltage amplitude of the main AC power supply. The filter 62 converts the square wave voltage appearing across the resistor 104 to a DC voltage level appearing across the capacitor 106 and whose magnitude depends on the duty cycle of the square wave signal received by the filter 62 from the opto coupler 102, since the charge and discharge times of the capacitor 106 are equal.

Figure 4:
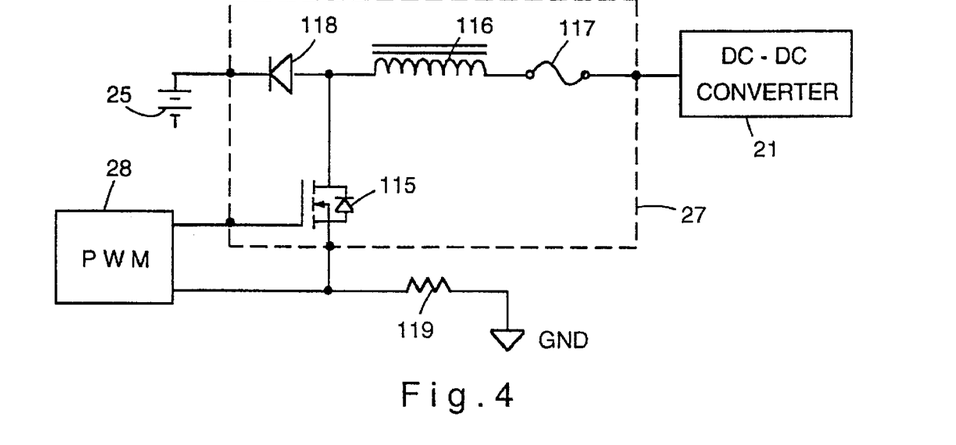
FIG. 4 is a simplified schematic representation of a boost charger for use with the UPS shown in FIG. 1.

Turning now to FIG. 4, the boost charger 27 is shown including a power MOSFET 115 connected in a standard configuration to an inductor 116 connected in series with a fuse 117 coupled to the 12 volt DC output from the DC to DC converter 21. Connected to the common junction of the MOSFET 115 and the inductor 116 is the anode of a diode 118 whose cathode, constituting the output terminal of the boost charger 27 is connected to the positive terminal of the battery 25.

Control of the MOSFET 115 is provided by the PWM 28 whose output is coupled to the gate of the MOSFET 115. The PWM 28 is fed a current sense signal from the source of the MOSFET 115 which is connected to GND via a resistor 119 which serves to limit the constant charge current fed by the boost charger 27 to the two batteries 25 and 26.

Figure 5:
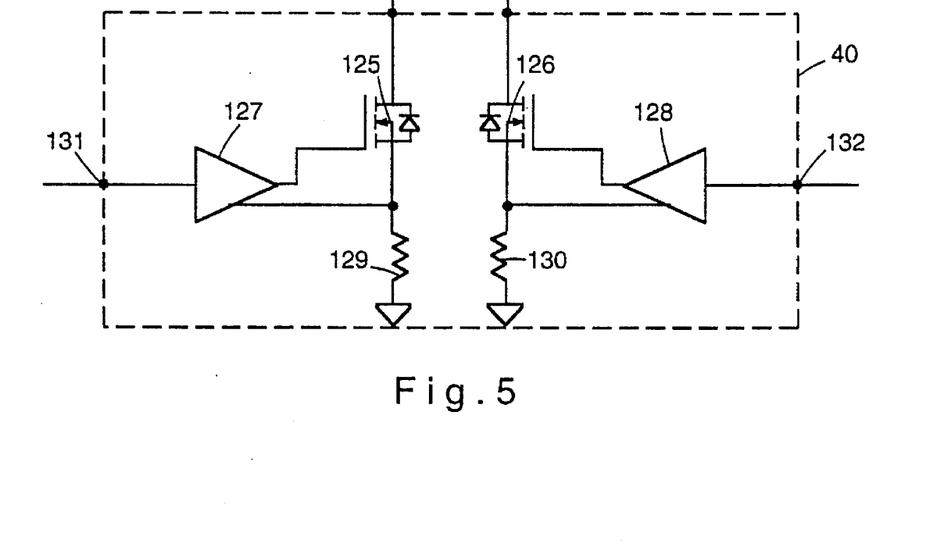
FIG. 5 is a simplified schematic representation of a power switch circuit for use with the UPS shown in FIG. 1.

FIG. 5 shows in detail the power switch 40 comprising a pair of MOSFETS 125 and 126 controlled by respective drivers 127 and 128. The source terminals of the respective MOSFETS 125 and 126 are coupled to GND via corresponding current sense resistors 129 and 130. The two drivers 127 and 128 receive pulse width modulation control signals at their input terminals 131 and 132 via the PWM 37 shown in FIG. 1 so as to provide periodic switching of the MOSFETS 125 and 126 whose respective drain terminals are connected across the primary winding 50 of the isolation transformer 51, the center tap of which is connected to the positive terminal of the battery 25.

Figure 6:
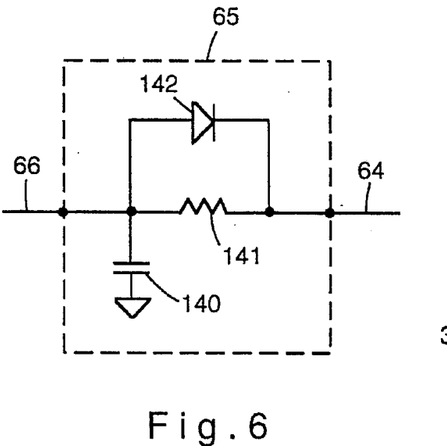
FIG. 6 is a schematic representation of an over-switch protection circuit (OSP) for use with the UPS shown in FIG. 1.

Referring now to FIG. 6, it may be seen that the overswitch protection circuit (OSP) 65 includes a capacitor 140 connected to a resistor 141 and to the anode of a diode 142 whose cathode is connected to the other terminal of the resistor 141. The common junction of the capacitor 140, the resistor 141 and the diode 142 constitute the output terminal 66 of the OSP 65. The common junction of the resistor 141 and the diode 142 constitute the input terminal 64 of the OSP 65 coupled to the comparator 63.

A low voltage signal level fed by the comparator 63 to the input terminal 64 of the OSP 65 allows the capacitor 140 to discharge through the diode 142 for so long as the diode 142 is forward biased. However, when a high level voltage signal is applied to the input terminal 64 of the OSP 65, thereby reverse biasing the diode 142, the capacitor 140 is slowly charged via the resistor 141. Since a failure of the AC main power supply detected by the opto isolator switch 61 causes the output of the comparator 63 to produce a low voltage level, whilst normal power across the AC supply line results in a high voltage level being produced at the output of the comparator 63, the OSP 65 acts to filter transient high voltage pulses and so protect the backup power supply 12 from false switching.

Figure 7:
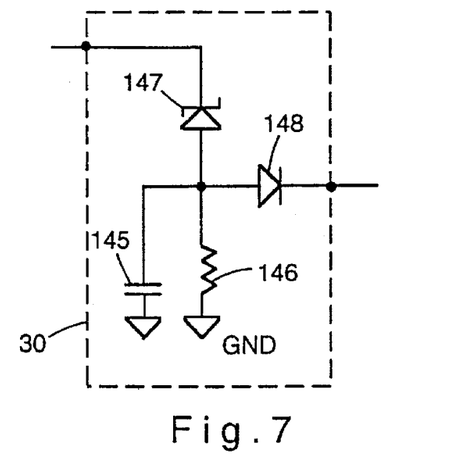
FIG. 7 is a schematic representation of an over-voltage protection circuit (OVP) for use in the UPS shown in FIG. 1.

FIG. 7 shows in detail the over-voltage protection circuit (OVP) 30 including a capacitor 145 and a resistor 146 connected in parallel between GND and the anode of a Zener diode 147 whose cathode is connected to the positive terminal of the batteries 25 and 26. The common junction between the capacitor 145, the resistor 146 and the anode of the Zener diode 147 is connected to the anode of a diode 148 whose cathode constitutes the output of the OVP 30 which is connected to the input of the timer 29. Thus, the battery voltage appears at the cathode of the Zener diode 147 and, for so long as the battery voltage exceeds the avalanche voltage of the Zener diode, the Zener diode 147 conducts current through the resistor 146 so as generate a voltage across the resistor 146 which feeds current through the diode 148 to the output terminal of the OVP 30, this signal in turn being fed to a first input the timer 29. The capacitor 145 serves to short transient high frequency voltage spikes to GND so that they are not fed via the diode 148 to the timer 29, thereby causing undesired operation of the timer 29.

Figure 8:
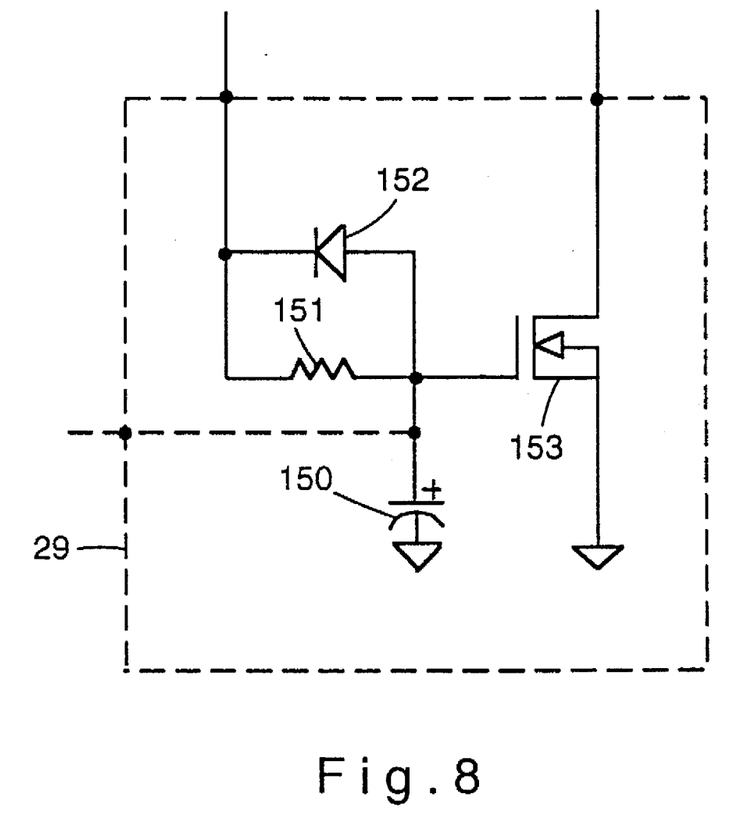
FIG. 8 is a schematic representation of a timer circuit for use with the UPS shown in FIG. 1.

FIG. 8 shows in detail the timer 29 which, as explained above, is fed to the output terminal of the OVP 30. The timer 29 includes a capacitor 150 connected between GND and a resistor 151 across which there is connected a diode 152 whose anode is connected to the capacitor 150 and whose cathode is connected to a second input terminal of the timer 29 connected to the output terminal 66 of the OSP 65. The common junction of the capacitor 150, the resistor 151 and the diode 152 is connected to the first input of the timer 29 and to the output of the OVP 30.

When a loss of AC power across the main line occurs, a low voltage level is applied to the second input of the timer so as to forward bias the diode 152 with respect to the capacitor voltage which is applied to the anode of the diode 152. Consequently, the capacitor 150 discharges through the diode 152 maintaining the MOSFET 153 in its switched "OFF" state such that the output terminal connected to the drain of the MOSFET 153 has a high voltage level, thereby enabling the boost charger 27.

When the AC main power is restored, the cathode of the diode 152 is fed a high voltage level which causes it to become reverse biased, whereupon the capacitor 150 starts to charge at a rate determined by the RC time constant of the resistor 151 and the capacitor 150. When the voltage across the capacitor 150 reaches approximately 4 volts, equal to the gate-source threshold voltage of the MOSFET 153, the MOSFET 153 switches "ON" so as effectively to shortcircuit the drain terminal to GND. Under these conditions, no signal is fed to the PWM 28 and the boost charger 27 is therefore disabled. Likewise, if a high voltage level is applied from the OVP circuit 30 to the timer 29, the capacitor 150 charges so as to switch the MOSFET 153 "ON", thereby preventing operation of the boost charger 27. By such means, the batteries 25 and 26 are charged for a maximum period of time determined by the timer 29 whilst overcharging of the batteries 25 and 26 is prevented by the OVP circuit 30.

It is thus clear that the auxiliary power supply serves to convert the switch power supply to a UPS whilst avoiding duplication of any of the stabilization and short circuit protection circuitry provided as standard in the switch power supply.

I claim:

1. An uninterruptible power supply including a backup power supply for connecting to an off-the-shelf switch power supply adapted for coupling to an AC line voltage for supplying at least DC electrical power to a load without requiring modification to the switch power supply;

the switch power supply comprising:
an EMI filter for coupling to the AC line voltage,
a rectifier coupled to an output of the EMI filter,
at least one holdover capacitor coupled to an output of the rectifier, and
a DC to DC converter coupled to the holdover capacitor; and the backup power supply comprising:
a DC energy storage device,
DC to DC step up converter means coupled to the DC energy storage device and to the holdover capacitor of the switch power supply,
charging means coupled to an output of the switch power supply and to the energy storage device, and
a detector circuit coupled to the AC power source for detecting a loss of said AC line voltage;
said backup power supply being responsive to a loss of said AC line voltage for supplying DC power from the DC energy storage device to the at least one holdover capacitor of the Switch Power Supply and being responsive to an existence of said AC line voltage for providing charging current to the DC energy storage device.

2. The uninterruptible power supply according to claim 1, wherein the DC energy storage device is a battery.

3. The uninterruptible power supply according to claim 2, wherein the DC to DC step up converter means includes a power switch coupled to the at least one holdover capacitor via an isolating transformer and a rectifier and further being coupled to the detector and responsive to a loss of said AC line voltage for transferring energy from the battery to the at least one holdover capacitor, a charging circuit coupled to the DC output of the switch power supply and to the detector and being responsive to the existence of the AC line voltage for charging the battery, and a DC to AC converter coupled to the at least one holdover capacitor and receiving electrical energy therefrom for supplying an AC voltage to an AC-driven peripheral device connected thereto operating at the AC line voltage.

4. The uninterruptible power supply according to claim 3, wherein the main power supply includes a main switch for switching the main power supply ON or OFF and the backup power supply further comprises:

a pulse width modulator having a pulse width stabilization loop coupled to the power switch of the DC to DC converter, a boost converter coupled to the DC output of the switch power supply and to the pulse width modulator for charging said battery, a relay coil coupled to the DC output of the switch power supply and responsive to an output voltage thereof for interrupting power to the backup circuit upon a failure of the switch power supply or when the main switch in the main power supply is switched to the OFF state;

said detector converting a sinusoidal voltage to a pulse width modulation signal for monitoring said existence or loss of the AC line voltage.

5. The uninterruptible power supply according to claim 1, wherein the backup power supply further includes a DC to AC converter for supplying an AC voltage to a peripheral device operating at said AC line voltage.

* * * * *